United States Patent
Thiriet et al.

(10) Patent No.: US 11,492,975 B2
(45) Date of Patent: Nov. 8, 2022

(54) PNEUMATIC DEVICE FOR RAPIDLY REACTIVATING A TURBINE ENGINE, ARCHITECTURE FOR A PROPULSION SYSTEM OF A MULTI-ENGINE HELICOPTER PROVIDED WITH SUCH A DEVICE, AND CORRESPONDING HELICOPTER

(71) Applicant: SAFRAN HELICOPTER ENGINES, Bordes (FR)

(72) Inventors: Romain Thiriet, Jurancon (FR); Camel Serghine, Boeil-bezing (FR); Frederic Moulon, Pau (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 182 days.

(21) Appl. No.: 15/327,631

(22) PCT Filed: Jul. 21, 2015

(86) PCT No.: PCT/FR2015/052009
§ 371 (c)(1),
(2) Date: Jan. 19, 2017

(87) PCT Pub. No.: WO2016/016547
PCT Pub. Date: Feb. 4, 2016

(65) Prior Publication Data
US 2017/0211483 A1     Jul. 27, 2017

(30) Foreign Application Priority Data
Jul. 28, 2014 (FR) ........................ 1457282

(51) Int. Cl.
*F02C 7/277* (2006.01)
*F01D 19/00* (2006.01)
(Continued)

(52) U.S. Cl.
CPC .............. *F02C 7/277* (2013.01); *B64C 27/06* (2013.01); *B64D 27/10* (2013.01); *B64D 31/06* (2013.01);
(Continued)

(58) Field of Classification Search
None
See application file for complete search history.

(56) References Cited

U.S. PATENT DOCUMENTS 1,476,059 A * 12/1923 Deutschmann ........ H02K 17/36
318/758
2,970,440 A * 2/1961 Dmitroff .................. F02C 7/27
60/402
(Continued)

FOREIGN PATENT DOCUMENTS

FR     2992024 A1    12/2013
GB     1476059 A     6/1977
(Continued)

OTHER PUBLICATIONS

International Search Report with English Language Translation, dated Nov. 10, 2015, PCT Application No. PCT/FR2015/052009.

*Primary Examiner* — Todd E Manahan
*Assistant Examiner* — Rodolphe Andre Chabreyrie
(74) *Attorney, Agent, or Firm* — Womble Bond Dickinson (US) LLP

(57) ABSTRACT

The invention relates to a device for the rapid reactivation of a helicopter turbine engine (6), characterised in that it comprises a pneumatic turbine (7) mechanically connected to said turbine engine (6) so as to be able to rotate it and ensure reactivation thereof; a pneumatic storage (9) connected to said pneumatic turbine (7) by means of a pneumatic circuit (10) for supplying pressurised gas to said pneumatic turbine (7); a controlled fast-opening pneumatic valve (11) arranged on the pneumatic circuit (10) between
(Continued)

Figure 1:
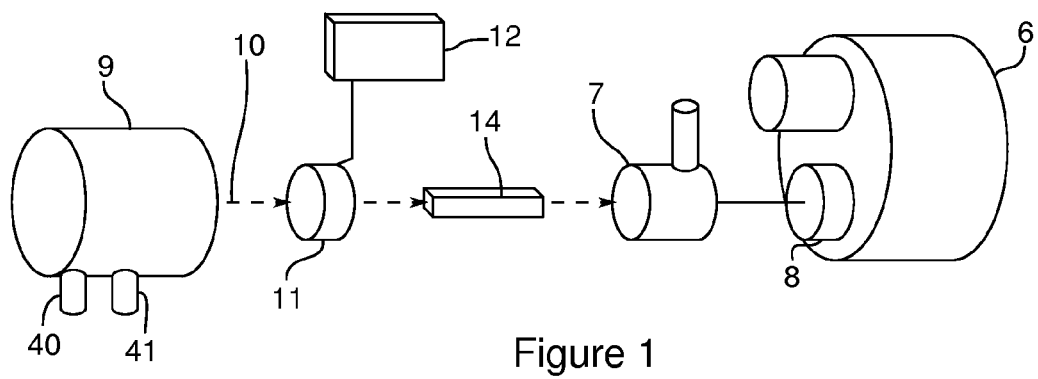

said storage (9) and said pneumatic turbine (7) and suitable for being on demand placed at least in an open position in which the gas can supply said pneumatic turbine (7), or in a closed position in which said pneumatic turbine (7) is no longer supplied with pressurised gas.

12 Claims, 2 Drawing Sheets

(51) Int. Cl.
  *B64C 27/06* (2006.01)
  *B64D 27/10* (2006.01)
  *B64D 31/06* (2006.01)
  *B64D 35/08* (2006.01)
  *A62C 3/08* (2006.01)

(52) U.S. Cl.
  CPC .............. *B64D 35/08* (2013.01); *F01D 19/00* (2013.01); *A62C 3/08* (2013.01); *B60Y 2200/52* (2013.01); *F05D 2220/329* (2013.01); *F05D 2260/85* (2013.01); *F05D 2270/093* (2013.01); *Y02T 50/60* (2013.01)

(56) References Cited

U.S. PATENT DOCUMENTS

| | | | | |
|---|---|---|---|---|
| 3,196,612 | A * | 7/1965 | Laville | B64C 27/12 60/788 |
| 3,869,862 | A * | 3/1975 | Dickey | F02C 6/02 244/17.11 |
| 4,434,621 | A * | 3/1984 | Barbeau | F02C 7/22 137/68.13 |
| 4,979,362 | A * | 12/1990 | Vershure, Jr. | F02C 7/272 60/788 |
| 5,735,116 | A * | 4/1998 | Mouton | F02C 7/262 60/39.091 |
| 5,957,210 | A * | 9/1999 | Cohrt | A62C 5/00 169/11 |
| 6,941,760 | B1* | 9/2005 | Jones | F02C 7/268 60/727 |
| 8,087,880 | B2* | 1/2012 | Karafillis | F01D 11/22 415/118 |
| 2005/0056724 | A1* | 3/2005 | Greene | F02C 3/305 244/10 |
| 2010/0058731 | A1* | 3/2010 | Haehner | F01D 15/08 60/39.15 |
| 2013/0031912 | A1* | 2/2013 | Finney | F02C 7/277 60/778 |
| 2013/0051975 | A1* | 2/2013 | Makulec | F02C 7/277 415/123 |
| 2013/0199201 | A1* | 8/2013 | Barkowsky | B64D 13/06 60/778 |
| 2015/0101331 | A1* | 4/2015 | Goulds | F02C 3/14 60/722 |
| 2016/0230672 | A1* | 8/2016 | Thiriet | F01D 19/00 |

FOREIGN PATENT DOCUMENTS

| | | | | |
|---|---|---|---|---|
| WO | WO-9205351 A1 * | 4/1992 | | B64D 41/00 |
| WO | WO-9205351 A1 | 4/1992 | | |
| WO | WO-2012059671 A2 * | 5/2012 | | F02C 6/206 |
| WO | WO-2012059671 A2 | 5/2012 | | |

* cited by examiner

PNEUMATIC DEVICE FOR RAPIDLY REACTIVATING A TURBINE ENGINE, ARCHITECTURE FOR A PROPULSION SYSTEM OF A MULTI-ENGINE HELICOPTER PROVIDED WITH SUCH A DEVICE, AND CORRESPONDING HELICOPTER

1. TECHNICAL FIELD OF THE INVENTION

The invention relates to a self-contained pneumatic device for the rapid reactivation of a turbine engine. The invention also relates to an architecture of a propulsion system of a multi-engine—in particular twin-engine or triple-engine—helicopter equipped with at least one such rapid reactivation device. The invention also relates to a helicopter comprising a propulsion system having such an architecture.

2. TECHNOLOGICAL BACKGROUND

A twin-engine or triple-engine helicopter has as is known a propulsion system comprising two or three turbine engines, each turbine engine comprising a gas generator and a free turbine rotated by the gas generator and secured to an output shaft. The output shaft of each free turbine is suitable for setting in motion a power transmission unit, which itself drives the rotor of the helicopter equipped with variable-pitch vanes.

It is known that helicopter turbine engines function at speeds that depend on the flight conditions of the helicopter. Throughout the following text, a helicopter is said to be in a cruising flight situation when it moves under normal conditions, during all phases of the flight, apart from the transient takeoff, climbing, landing or stationary flight phases. Throughout the following text, a helicopter is said to be in a critical flight situation when it is necessary for it to have available the total installed power, that is to say in the transient takeoff, climbing and landing phases and a situation in which one of the turbine engines is faulty, designated by the English acronym OEI (one engine inoperative).

It is known that, when the helicopter is in a cruising flight situation, the turbine engines function at low power levels, below their maximum continuous power. These low power levels give rise to a specific consumption (hereinafter Cs), defined as the ratio between the hourly consumption of fuel by the combustion chamber of the turbine engine and the mechanical power supplied by this turbine engine, greater than around 30% of the Cs of the maximum takeoff power, and therefore overconsumption of fuel in cruising flight.

Furthermore, the turbine engines of a helicopter are designed so as to be oversized in order to be able to maintain the helicopter in flight in the event of failure of one of the engines. This flight situation corresponds to the OEI regime described above. This flight situation occurs following the loss of an engine and results in the fact that each engine in operation supplies a power much beyond its nominal power to enable the helicopter to deal with a hazardous situation, and then to be able to continue its flight.

Moreover, the turbine engines are also oversized in order to be able to ensure flight throughout the flight range specified by the aircraft constructor and in particular flight at high altitudes and in hot weather. These flight points, which are highly demanding, in particular when the helicopter has a weight close to its maximum takeoff weight, are encountered only in certain circumstances of use.

These oversized turbine engines are detrimental in terms of weight and fuel consumption. In order to reduce this consumption in cruising flight, it is envisaged putting one of the turbine engines on standby in flight. The active engine or engines then function at higher power levels in order to provide all the power necessary and therefore at more favourable Cs levels.

The applicants, in the applications FR 1151717 and FR 1359766, proposed methods for optimising the specific consumption of the turbine engines of a helicopter through the possibility of placing at least one turbine engine in a so-called continuous stabilised power regime, and at least one turbine engine in a particular standby regime from which it can emerge in an emergency or normal manner, according to the requirements. An emergence from standby regime is said to be normal when a change in the flight situation imposes the activation of the turbine engine on standby, for example when the helicopter goes from a cruising flight situation to a landing phase. Such a normal emergence from standby takes place over a period of 10 seconds to 1 minute. An emergence from standby regime is said to be rapid when a failure or power deficit of the active engine occurs or the flight conditions become suddenly difficult. Such a rapid emergence from standby takes place over a period of less than 10 seconds.

The emergence of a turbine engine from standby regime is obtained for example by means of a turbine-engine restarting pack associated with an energy storage device such as electrochemical storage of the Li-Ion battery type or electrostatic storage of the supercapacitor type, which makes it possible to supply the turbine engine with the necessary energy for reactivating and rapidly reaching nominal operating speed.

Such a pack for rapid reactivation of the turbine engine on standby has the drawback of substantially increasing the total weight of the turbine engine. The gain in fuel consumption obtained by putting the turbine engine on standby is therefore partly lost by the excess weight caused by the reactivation device and the associated energy storage device, in particular when each turbine engine is equipped with such an emergency reactivation device.

Furthermore, these electrotechnical components may be dependent on the electrical architecture of the helicopter on which they are mounted.

The inventors therefore sought to reconcile a priori incompatible problems caused by the possibility of placing the helicopter in economical flight phase, that is to say putting at least one turbine engine on standby, without generating excessively great excess weight of the whole of the propulsion system, while allowing rapid emergence from standby regime.

In other words, the inventors sought to propose a novel device for rapid reactivation of a turbine engine and a novel architecture of the propulsion system of a twin-engine or triple-engine helicopter.

3. OBJECTIVES OF THE INVENTION

The invention aims to provide a device for the rapid reactivation of a turbine engine that overcomes the drawbacks of the prior solutions.

The invention also aims to provide a novel architecture of the propulsion system of a multi-engine helicopter.

The invention also aims to provide an architecture of a propulsion system of a multi-engine helicopter that enables a turbine engine to be put on standby and to be rapidly reactivated.

The invention also aims to provide, in at least one embodiment of the invention, an architecture that has a weight and volume that are not prohibitive for being able to be installed in a helicopter.

The invention also aims to provide, in at least one embodiment of the invention, an architecture that has a lower cost than the architectures of the prior art for equal performances.

The invention also aims to provide a method for the rapid reactivation of a turbine engine.

4. DISCLOSURE OF THE INVENTION

To do this, the invention relates to a device for the rapid reactivation of a helicopter turbine engine, characterised in that it comprises:

- a pneumatic turbine mechanically connected to said turbine engine so as to be able to rotate it and ensure reactivation thereof,
- a pneumatic storage connected to said pneumatic turbine by means of a pneumatic circuit for supplying pressurised gas to said pneumatic turbine,
- a controlled fast-opening pneumatic valve arranged on the pneumatic circuit between the storage and said pneumatic turbine and suitable for being on demand placed at least in an open position in which the gas can supply said pneumatic turbine, thus allowing reactivation of said turbine engine, or in a closed position in which said pneumatic turbine is no longer supplied with pressurised gas.

A device for reactivating a turbine engine according to the invention therefore provides a pneumatic device—preferably completely independent of the electrical system of the helicopter on which such a turbine engine is intended to be installed—in order to provide reactivation of the turbine engine.

A device for the rapid reactivation of a turbine engine aims mainly to rapidly reactivate a turbine engine on standby so that it can quickly come out of the standby regime in which it was placed in order once again to supply mechanical power. According to another application, a rapid reactivation device may also serve as a device for starting a turbine engine, that is to say activating a turbine engine without prior putting on standby. This being the case, throughout the following description, the use of the device according to the invention is essentially discussed as a device for reactivating a turbine engine on standby.

A turbine engine comprises, in a known manner, a gas generator and a free turbine supplied by the gas generator and connected to a power transmission unit. Preferably, a reactivation device according to the invention provides for the gas generator of the turbine engine to be rotated by the pneumatic turbine suitable for transforming the pneumatic power of the pressurised gas that supplies the turbine into a mechanical power for driving the gas generator.

The supply of gas to the pneumatic turbine is achieved by the cooperation of a pneumatic storage and a controlled fast-opening valve.

Such a reactivation device is therefore independent of the electrical system of the helicopter and does not require bulky storage batteries. The solution proposed therefore ensures rapid reactivation of a turbine engine, in particular a turbine engine placed in standby regime, without giving rise to problems of bulk, mass and cost.

In addition, a device according to the invention is simple to use and can be tested on the bench before being integrated in a helicopter.

Advantageously, a device according to the invention further comprises a pressure-reducing valve arranged on the pneumatic circuit between the pneumatic valve and the pneumatic turbine and configured so as to regulate the pressure of the gas supplying the pneumatic turbine.

A pressure-reducing valve therefore makes it possible to adapt the pressure of the gas supplied to the pneumatic turbine to the type of pneumatic turbine used and to the type of pneumatic storage used. According to a variant, the pneumatic storage comprises a high-pressure gas, for example between 200 and 400 bar, and the pneumatic turbine is supplied by means of the pressure-reducing valve, by a gas having a pressure of between 5 and 50 bar.

Advantageously and according to the invention, the pneumatic turbine is mechanically connected to the turbine engine by means of at least one free-wheel.

The presence of the free-wheel makes it possible to avoid spontaneous driving of the pneumatic turbine by the gas generator when the latter supplies mechanical power. Advantageously, the free-wheel is mounted on an accessory box of the turbine engine.

Advantageously and according to the invention, the pneumatic storage contains a mixture of gas comprising by mass at least 50% neutral gas and a fire-extinguishing agent.

Such a gas mixture makes it possible not only to supply the pneumatic turbine with gas in order to ensure reactivation of the turbine engine, but also to supply a fire-extinguishing system arranged, for example, in the vicinity of the turbine engine in order to allow the extinction of any fire in this turbine engine. The neutral gas may be of any type, such as nitrogen, helium or argon. The fire-extinguishing agent is for example halon.

A device according to this variant, in combination with a fire-extinguishing system, therefore makes it unnecessary to equip the helicopters with dedicated fire-extinguishing cylinders.

Advantageously and according to the invention, the turbine comprises a low-pressure supply socket configured so as to be able to carry out an integrity test on the kinematic chain formed by the pneumatic turbine and the free-wheel.

Such a supply socket makes it possible to test the kinematic chain formed by the pneumatic turbine and the free-wheel and therefore to guarantee that the turbine engine will actually be able to be reactivated quickly in the event of emergency. It is therefore a means for establishing control and safety measures. Such a test may for example be carried out on the ground by the use of an air compressor of the pool unit type. This test can also be carried in flight by taking air discharged from a compressor on one or other of the turbine engines.

Advantageously and according to the invention, the pneumatic valve is controlled for position by electronic equipment and controlled for opening by pyrotechnic equipment.

Pyrotechnic equipment allows rapid opening of the pneumatic valve and therefore rapid reactivation of the turbine engine.

The invention also relates to an architecture of a propulsion system of a multi-engine helicopter comprising turbine engines connected to a power transmission unit, characterised in that it comprises:

- at least one turbine engine among said turbine engines, referred to as a hybrid turbine engine, able to function in at least one standby regime during a stabilised flight of the helicopter, the other turbine engines functioning alone during this stabilised flight,
- at least one device for the rapid reactivation of a hybrid turbine engine according to the invention suitable for being able to bring this hybrid turbine engine out of said standby regime and to reach a so-called nominal regime in which it supplies mechanical power to said power transmission unit.

A device for reactivating a turbine engine according to the invention is particularly intended to be integrated in an architecture of a propulsion system of a multi-engine helicopter comprising at least one turbine engine able to be put on standby. The pneumatic reactivation device makes it possible to ensure rapid reactivation of the turbine engine on standby if needed.

Advantageously, an architecture according to the invention comprises at least one fire-extinguishing device arranged in the vicinity of a turbine engine and connected to said pneumatic valve of an emergency start-up device by means of a so-called fire conduit, so that said gas in said pneumatic storage of this reactivation device can be conducted on command from said valve to said extinguishing device.

An architecture according to this variant comprises at least one fire-extinguishing device arranged in the vicinity of a turbine engine in order to be able to extinguish a fire in the turbine engine using the pneumatic circuit of the rapid reactivation device. To do this, the hydropneumatic storage advantageously comprises a gas mixture comprising by mass at least 50% neutral gas, and a fire-extinguishing agent.

Advantageously, an architecture according to the invention comprises two hybrid turbine engines and two emergency start devices according to the invention, each hybrid turbine engine being associated with a dedicated reactivation device.

According to this variant, the architecture has a separate pneumatic supply for each pneumatic turbine for starting each hybrid turbine engine.

Advantageously, an architecture according to the invention comprises two hybrid turbine engines and a single reactivation device according to the invention that comprises two pneumatic turbines connected respectively to each hybrid turbine engine, said pneumatic valve being a three-way valve controlled so as to orient the gas to said pneumatic turbine of the hybrid turbine engine to be reactivated.

According to this variant, the valve is controlled so as to orient the gas from the pneumatic circuit to the hybrid turbine engine that is to be reactivated.

The invention also relates to a helicopter comprising a propulsion system characterised in that said propulsion system has an architecture according to the invention.

The invention also relates to a method for the rapid reactivation of a turbine engine of a helicopter, characterised in that it comprises:
- a step of controlling the opening of a pneumatic valve arranged on a pneumatic circuit between a pneumatic storage and a pneumatic turbine mechanically connected to said turbine engine,
- a step of conveying the gas taken off to said pneumatic turbine,
- a step of transformation, by said pneumatic turbine, of the pneumatic power of said pressurised gas into mechanical power in order to reactivate the turbine engine.

The invention also relates to a device for reactivating a turbine engine, an architecture of a propulsion system of a multi-engine helicopter, a helicopter equipped with a propulsion system having such an architecture and a method for reactivating a turbine engine, characterised in combination by all or some of the features mentioned above or below.

5. LIST OF FIGURES

Figure 2:
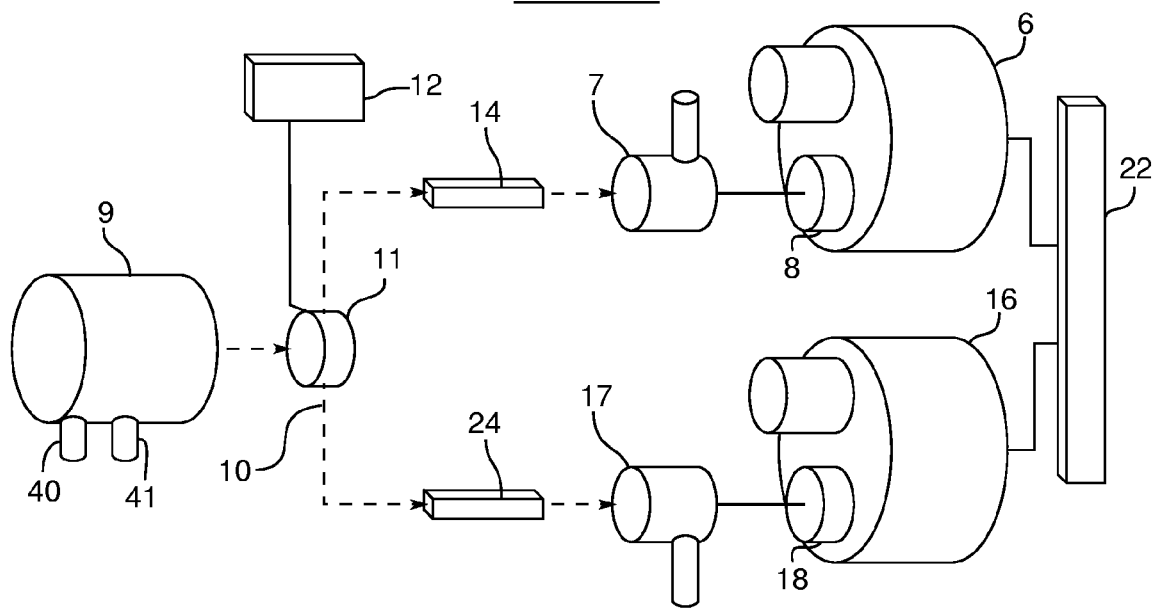
Figure 3:
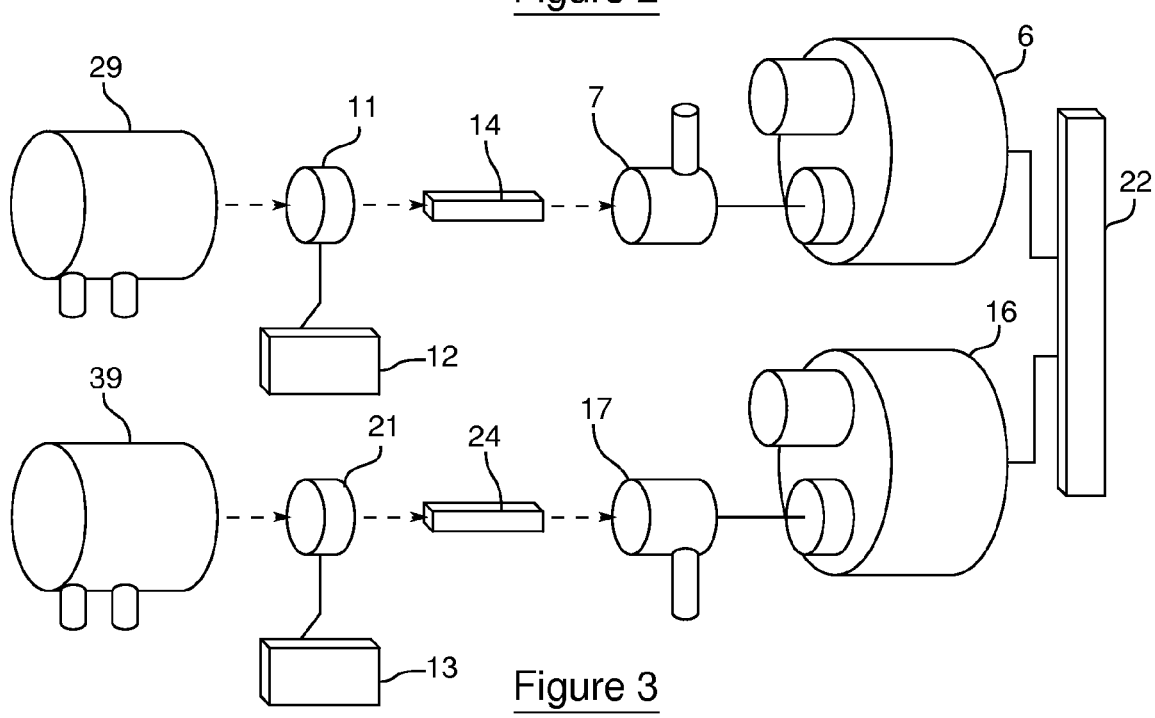
Figure 4:
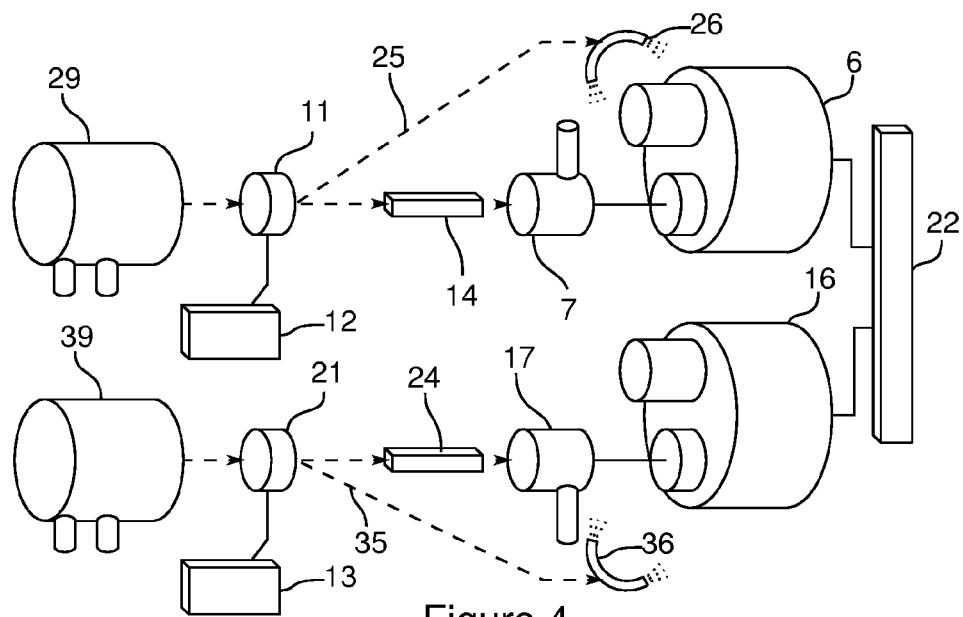
Figure 5:
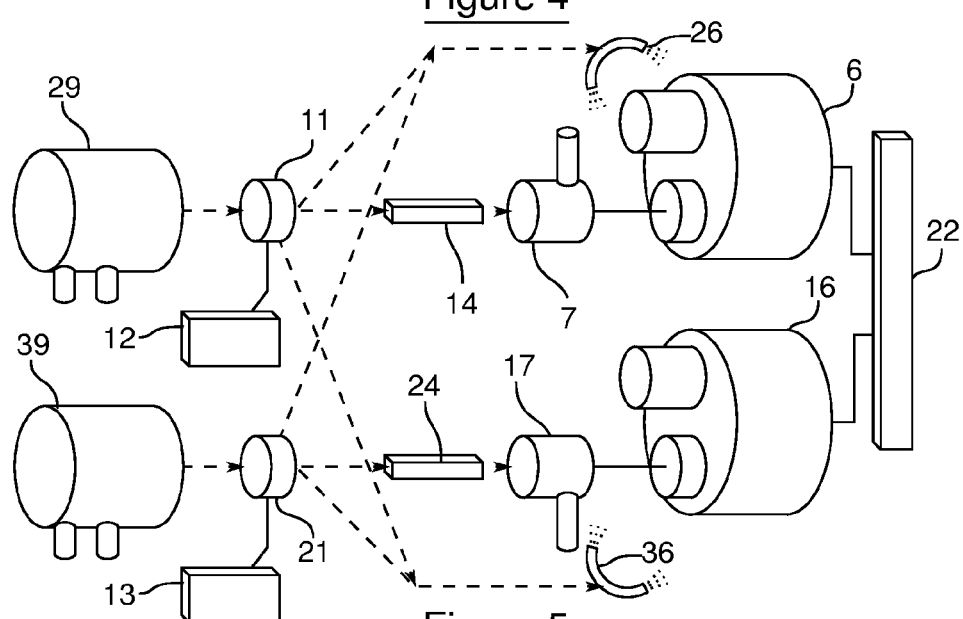
Figure 6:
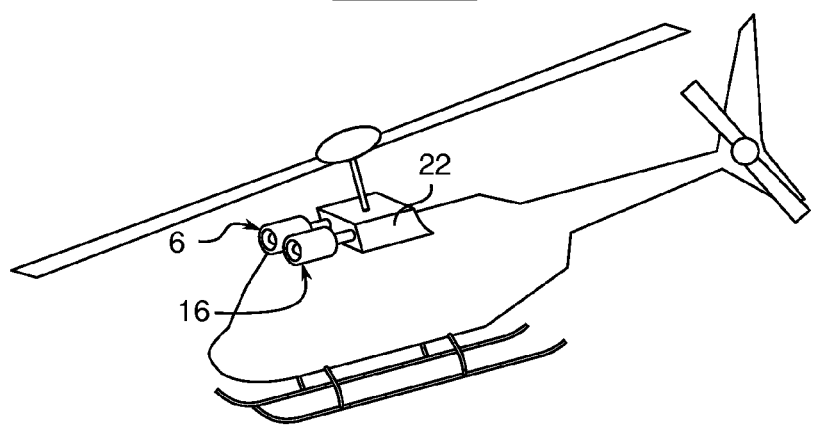

Other aims, features, and advantages of the invention will emerge from a reading of the following description given solely non-limitatively and which refers to the accompanying figures, in which:

FIG. 1 is a schematic view of a device for reactivating a turbine engine according to one embodiment of the invention, FIG. 2 is a schematic view of an architecture of a propulsion system of a helicopter according to one embodiment of the invention, FIG. 3 is a schematic view of an architecture of a propulsion system of a helicopter according to another embodiment of the invention, FIG. 4 is a schematic view of an architecture of a propulsion system of a helicopter according to another embodiment of the invention, FIG. 5 is a schematic view of an architecture of a propulsion system of a helicopter according to another embodiment of the invention, FIG. 6 is a schematic view of helicopter comprising a propulsion system having an architecture according to the invention.

6. DETAILED DESCRIPTION OF AN EMBODIMENT OF THE INVENTION

In the figures, the scales and proportions are not complied with, for purposes of illustration and clarity.

FIG. 1 is a schematic view of a device for reactivating a turbine engine 6 according to one embodiment of the invention.

Such a device comprises a pneumatic turbine 7 connected mechanically to the turbine engine 6 by means of a freewheel 8. This pneumatic turbine 7 may be a radial or axial turbine, with one or more stages. Its function is to transform the pneumatic power that it receives into a mechanical power for reactivating the turbine engine 6.

This pneumatic turbine 7 is preferably mounted on the turbine engine 6 by means of an accessory box, not shown in FIG. 1.

The device further comprises a pneumatic storage 9 connected to the pneumatic turbine 7 by means of a pneumatic circuit 10 supplying this pneumatic turbine 7 with pressurised gas.

The supply to the pneumatic turbine 7 is dependent on a controlled fast-opening pneumatic valve 11 that is arranged on the pneumatic circuit 10 between the storage 9 and the pneumatic turbine 7.

This pneumatic valve 11 is, in the embodiment in FIG. 1, a two-way valve controlled by a control device 12, which is preferably the computer controlling the turbine engine 6, which also makes it possible to define the operating regime of the turbine engine.

When the valve 11 is controlled for opening, the gas in the storage 9 is ejected towards the pneumatic turbine 7 so that it can transform the pneumatic power of the gas received into an output mechanical power.

The pneumatic circuit 10 further comprises a pressure reducer 14 arranged between the storage 9 and the pneumatic turbine 7 to regulate the pressure of the gas supplying the pneumatic turbine 7.

The pneumatic storage 9 further comprises a pressure sensor 40 and a safety valve 41. The pneumatic storage 9 has for example a 250 bar nitrogen capacity.

The reactivation device of FIG. 1 advantageously equips an architecture of a propulsion system of a twin-engine helicopter as shown in FIG. 2.

According to the embodiment in FIG. 2, the propulsion system comprises two turbine engines 6, 16 connected to a power transmission box 22, which itself drives a rotor of the helicopter (not shown in the figures). Each turbine engine is a hybrid turbine engine, able to be put in at least one standby regime during a stabilised flight of the helicopter, from which it can emerge quickly by means of a reactivation device according to the invention. A turbine engine comprises in a known fashion a gas generator, a combustion chamber and a free turbine.

The standby regime is for example one of the following operating regimes:
- a standby regime, referred to as normal tickover, in which the combustion chamber is ignited and the shaft of the gas generator turns at a speed of between 60% and 80% of the nominal speed,
- a standby regime, referred to as normal super-tickover, in which the combustion chamber is ignited and the shaft of the gas generator turns at a speed of between 20% and 60% of the nominal speed,
- a standby regime, referred to as assisted super-tickover, in which the combustion chamber is ignited and the shaft of the gas generator turns, assisted mechanically, at a speed of between 20% and 60% of the nominal speed,
- a standby regime, referred to as turnover mode, in which the combustion chamber is extinguished and the shaft of the gas generator turns, assisted mechanically, at a speed of between 5% and 20% of the nominal speed,
- a standby regime, referred to as stoppage, in which the combustion chamber is extinguished and the shaft of the gas generator is completely at rest.

The reactivation device comprises, in addition to the elements described in relation to FIG. 1, a pneumatic turbine 17 connected to the turbine engine 16 by means of a free-wheel 18. Furthermore, the pneumatic circuit 10 extends from the pneumatic storage 9 as far as the pneumatic turbine 17 and the pneumatic turbine 7.

The controlled valve 11 is, according to this embodiment, a three-way valve suitable for allowing, on command, either the supply to the pneumatic turbine 17 connected to the turbine engine 16, or the supply to the pneumatic turbine 7 of the turbine engine 6. The control is a function of the turbine engine on standby that is to emerge in emergency from its standby regime.

The operating principle of the reactivation device of this architecture is, for each turbine engine 6, 16, identical to the one described in relation to FIG. 1.

FIG. 3 is an architecture according to another embodiment of the invention. According to this embodiment, a separate reactivation device is provided for each turbine engine. In other words, a pneumatic storage 29, 39 is associated with each pneumatic turbine 7, 17 and a two-way valve 11, 21 is associated with each storage 29, 39 in order to provide the supply to the turbines and the restarting of the corresponding turbine engine. The valves 11, 21 are controlled respectively by computers 12, 13, one computer per device. In a variant, a single computer may control the two valves. Furthermore, each turbine is associated with a dedicated pressure reducer 14, 24 intended to regulate the pressure of the gas supplying the corresponding turbine.

The architecture in FIG. 4 is based on the architecture in FIG. 3 and comprises, in addition to the elements described in relation to FIG. 3, a fire-extinguishing system. This extinguishing system comprises one fire-extinguishing device per turbine engine. The architecture in FIG. 4 therefore comprises two extinguishing devices. Each device comprises a fire conduit 25, 35 arranged between the corresponding valve 21, 31 and a fire nozzle 26, 36 arranged in the vicinity of, and in the direction of, the corresponding turbine engine 6, 16 so as to be able to spray gas towards the turbine engine in the event of fire. According to this embodiment, the valves 11, 21 are three-way valves. In the event of the detection of a fire in the vicinity of a turbine engine, for example the turbine engine 6, by a fire sensor, the unit 12 demands the opening of the valve 11 corresponding to the turbine engine 6 so that the gas stored in the storage 29 (formed by a mixture of a neutral gas and a fire-extinguishing agent of the halon type) is propelled towards the fire nozzle 26 in order to extinguish the fire in the turbine engine 6.

The architecture in FIG. 5 is a variant of the architecture in FIG. 4 in which each fire nozzle 26, 36 can be supplied by each pneumatic storage 29, 39 on demand from the valves 11, 21, which are four-way valves. To do this, each fire nozzle is supplied by two separate fire conduits. Such an architecture makes it possible to use the gases of each reactivation device in order to deal with a fire in one or other of the turbine engines.

FIG. 6 is a schematic view of a twin-engine helicopter comprising a propulsion system having an architecture according to the invention. The propulsion system comprises in particular two turbine engines 6, 16 suitable for rotating a rotor by means of the power transmission unit 22. In this figure, the reactivation devices are not shown, for reasons of clarity. Only the turbine engines 6, 16 are shown, it being understood that each turbine engine is equipped with a reactivation device according to the invention.

The principle of use of a device for reactivating a turbine engine in a twin-engine architecture as shown by FIG. 2 is as follows:
- when the flight conditions are favourable, an instruction is issued to put a turbine engine on standby in order to save on fuel (a standby regime chosen from the standby regimes mentioned above),
- the computers of the turbine engines then determine which turbine engine can be put on standby and demand the putting on standby thereof (hereinafter, it is considered that the turbine engine 6 is put on standby and that only the turbine engine 16 supplies power to the power transmission unit 22),
- the turbine engine 6 is in standby regime (this standby regime may be one of the aforementioned standby regimes, with a chamber ignited or extinguished, mechanically assisted or not),
- during the flight, the turbine engine 16 suddenly fails or the pilot decides to quickly reactivate the turbine engine 6 for a particular emergency manoeuvre,
- the combustion chamber of the turbine engine 6 is then quickly reignited (the case of a standby regime with chamber extinguished),
- after a predetermined period, the control unit 12 demands the opening of the valve 11 to the turbine engine 6,
- the pneumatic turbine 7 then quickly goes (within a period of less than one second) from 0 rev/min to the coupling speed of the gas generator initially in standby regime by transforming the pneumatic power into a mechanical power making it possible to drive the gas generator of the turbine engine 6 by means of the free-wheel 8,
- the pneumatic turbine 7 continues the driving of the turbine engine 6 for a short period, for example less than 3 seconds, during which the turbine engine has reached its emergency regime, rapid reactivation of the turbine engine 6 is therefore obtained.

The coupling speed corresponds to the standby speed of the gas generator divided by the speed reduction ratio between the shaft of the gas generator and the input of the accessory box of the turbine engine on which the pneumatic starter is mounted.

A device according to the invention therefore makes it possible to quickly reactivate a turbine engine on standby, using only inexpensive components that are simple to use and install and can be tested on benches.

The invention is not limited solely to the embodiments described. In particular, the architecture may comprise three turbine engines for equipping a triple-engine helicopter, and persons skilled in the art would easily determine, on the basis of the teachings of the present text, how to adapt the embodiments described to a multi-engine propulsion system, in particular a triple-engine one.

Although dedicated to rapid reactivation phases, the invention can also be used during rapid starting on the ground or during rapid restarting in flight.

The invention claimed is:

1. A device for a rapid reactivation of a helicopter turbine engine, comprising:
    a pneumatic turbine mechanically connected to said turbine engine so as to be able to rotate said turbine engine and ensure the rapid reactivation thereof during an emergency,
    a pneumatic storage connected to said pneumatic turbine by means of a pneumatic circuit for supplying pressurised gas to said pneumatic turbine,
    a controlled fast-opening pneumatic valve arranged on the pneumatic circuit between said storage and said pneumatic turbine and suitable for being on demand placed at least in an open position in which the gas can supply said pneumatic turbine, thus allowing reactivation of said turbine engine during said emergency, or in a closed position in which said pneumatic turbine is no longer supplied with the pressurised gas, wherein said pneumatic storage contains a mixture of gases comprising by mass at least 50% neutral gas, and a fire-extinguishing agent.

2. The device according to claim 1, further comprising a pressure reducer arranged on said pneumatic circuit between said pneumatic valve and said pneumatic turbine and configured to regulate a pressure of said gas supplying said pneumatic turbine.

3. The device according to claim 1, wherein said pneumatic turbine is mechanically connected to said turbine engine by means of at least one free-wheel.

4. The device according to claim 1, wherein said pneumatic turbine comprises a low-pressure supply socket configured so as to be able to carry out an integrity test on a kinematic chain formed by the pneumatic turbine and the free-wheel.

5. The device according to claim 1, wherein said pneumatic valve is controlled for position by electronic equipment and controlled for opening by pyrotechnic equipment.

6. The device according to claim 1, wherein the pneumatic turbine mechanically connected to said turbine engine rotates said turbine engine and ensures the rapid reactivation thereof in less than 10 seconds during said emergency.

7. An architecture of a propulsion system of a multi-engine helicopter comprising at least two turbine engines connected to a power transmission unit, comprising:
    at least one turbine engine among said at least two turbine engines, referred to as the hybrid turbine engine, said hybrid turbine engine being able to function in at least one standby regime during a stabilised flight of the helicopter, the remaining turbine engine(s) functioning alone during this stabilised flight,
    at least one device for allowing said reactivation of the hybrid turbine engine according to claim 1, suitable for being able to bring said hybrid turbine engine out of said standby regime and to reach a so-called nominal regime in which said hybrid turbine engine supplies mechanical power to said power transmission unit.

8. The architecture according to claim 7, comprising at least one fire-extinguishing device arranged in the vicinity of one of the at least two turbine engines and connected to said pneumatic valve of the at least one device for said reactivation by means of so-called fire conduit, so that said gas in said pneumatic storage of the at least one device for said reactivation can be conducted on command from said valve to said fire-extinguishing device.

9. A helicopter comprising a propulsion system wherein said propulsion system has an architecture according to claim 7.

10. An architecture of a propulsion system of a multi-engine helicopter comprising at least two turbine engines connected to a power transmission unit, the architecture comprising:
    at least one turbine engine among said at least two turbine engines, referred to as the at least one hybrid turbine engine, said hybrid turbine engine being able to function in at least one standby regime during a stabilised flight of the helicopter, the remaining turbine engine(s) functioning alone during this stabilised flight,
    at least one device for the reactivation of the at least one hybrid turbine engine according to claim 1, suitable for being able to bring said hybrid turbine engine out of said standby regime and to reach a so-called nominal regime in which it supplies mechanical power to said power transmission unit,
    wherein the at least one hybrid turbine engine comprises two hybrid turbine engines and the at least one device for said reactivation comprises two devices for said reactivation, each hybrid turbine engine of said two hybrid turbine engines being associated with a dedicated device for said reactivation of said two devices for said reactivation.

11. An architecture of a propulsion system of a multi-engine helicopter comprising at least two turbine engines connected to a power transmission unit, said architecture comprising:
    at least one turbine engine among said at least two turbine engines, referred to as the at least one hybrid turbine engine, the at least one hybrid turbine engine being able to function in at least one standby regime during a stabilised flight of the helicopter, the remaining turbine engine(s) functioning alone during this stabilised flight,
    at least one device for said reactivation of a hybrid turbine engine according to claim 1, suitable for being able to bring the at least one hybrid turbine engine out of said standby regime and to reach a so-called nominal regime in which it supplies mechanical power to said power transmission unit,
    wherein the at least one hybrid turbine engine comprises two hybrid turbine engines and the at least one device for said reactivation comprises a single device for reactivation that comprises two pneumatic turbines, each pneumatic turbine of the two pneumatic turbines being connected to a respective hybrid turbine engine of the two hybrid turbine engines, said pneumatic valve being a three-way valve controlled so as to orient the gas to said each pneumatic turbine of the hybrid turbine engine to be reactivated.

12. An architecture of a propulsion system of a multi-engine helicopter comprising at least two turbine engines connected to a power transmission unit, comprising:
- at least one turbine engine among said at least two turbine engines, referred to as the hybrid turbine engine, said hybrid turbine engine being able to function in at least one standby regime during a stabilised flight of the helicopter, the remaining turbine engine(s) functioning alone during this stabilised flight,
- at least one device for allowing said reactivation of the hybrid turbine engine, the device comprising:
- a pneumatic turbine mechanically connected to the hybrid turbine engine so as to be able to rotate the hybrid turbine engine and ensure the rapid reactivation thereof during an emergency,
- a pneumatic storage connected to said pneumatic turbine by means of a pneumatic circuit for supplying pressurised gas to said pneumatic turbine,
- a controlled fast-opening pneumatic valve arranged on the pneumatic circuit between said storage and said pneumatic turbine and suitable for being on demand placed at least in an open position in which the gas can supply said pneumatic turbine, thus allowing reactivation of said hybrid turbine engine during said emergency, or in a closed position in which said pneumatic turbine is no longer supplied with the pressurised gas,
- the device for bringing said hybrid turbine engine out of said standby regime and to reach a so-called nominal regime in which said hybrid turbine engine supplies mechanical power to said power transmission unit,
- at least one fire-extinguishing device arranged in the vicinity of one of the at least two turbine engines and connected to said pneumatic valve of the at least one device for said reactivation by means of so-called fire conduit, so that said gas in said pneumatic storage of the at least one device for said reactivation can be conducted on command from said valve to said fire-extinguishing device.

* * * * *